(12) United States Patent
Stefanucci

(10) Patent No.: US 6,814,769 B1
(45) Date of Patent: Nov. 9, 2004

(54) FLUE AND GREASE COLLECTING ASSEMBLY

(76) Inventor: Richard Stefanucci, 1818 Griswold La., Victor, MT (US) 59875

(*) Notice: Subject to any disclaimer, the term of this patent is extended or adjusted under 35 U.S.C. 154(b) by 0 days.

(21) Appl. No.: 10/280,434

(22) Filed: Oct. 25, 2002

(51) Int. Cl.[7] ............................................. F24C 15/20
(52) U.S. Cl. ................... 55/385.1; 55/385.2; 55/323; 55/486; 55/511; 55/DIG. 36; 126/299 D; 126/299 E; 126/299 R
(58) Field of Search ................. 55/385.1, 385.2, 55/323, 486, 511, DIG. 36; 126/299 D, 299 E, 299 R

(56) References Cited

U.S. PATENT DOCUMENTS

| | | | | |
|---|---|---|---|---|
| 4,432,274 A | * | 2/1984 | Kurotaki .................. | 126/299 E |
| 5,814,115 A | * | 9/1998 | Allen et al. ............. | 55/DIG. 36 |
| 6,036,736 A | * | 3/2000 | Wallace et al. ............ | 55/385.2 |
| 6,143,047 A | * | 11/2000 | Jodoin et al. .......... | 55/DIG. 36 |

OTHER PUBLICATIONS

Webster's Ninth Collegiate Dictionary, Merriam–Webster Inc. Publishers, 1991, p. 475.*

* cited by examiner

Primary Examiner—Duane Smith
Assistant Examiner—Minh-Chau T. Pham
(74) Attorney, Agent, or Firm—Frank L. Zugelter

(57) ABSTRACT

An assembly of a slot(35) in a bottom wall (21) of a flue (10) in immediate conjunction with a compartment (25) in which a stack of layers (33) of fibrous material is deposited or stacked for absorbing grease (13) from a passageway of a venting housing (13). The vented air (14) and grease (13) flow to flue (10) by an independent force for generating such flow. As the vented air (14) and grease (15) reach flue (10) the air continues to flow through flue (10) to discharge through the latter's escape opening (19) while grease (15) drops through slot (35) onto the top one of a stack of layers (33) of fibrous material in compartment (25), thereby removing the problem of an accumulation of grease (15) on a roof or base (40) over which compartment (25) is located, thereby averting the need for repair of or installation of a new roof or base. The length of compartment (25) is longer than the extent of length of flue (10) so that ingress and egress to a soiled top layer (33) of fibrous material is available for removal and installation of a fresh one or set of layers (33). A series of apertures (45) is provided in bottom wall (30) of compartment (25) for draining accumulation of water.

24 Claims, 2 Drawing Sheets

FLUE AND GREASE COLLECTING ASSEMBLY

TECHNICAL FIELD

This invention pertains to the collecting or trapping of grease flowing through and from a vent housing, and is particularly related to an assembly of a fibrous-catching utility compartment in combination with a slotted flue.

BACKGROUND TO THE INVENTION

Publications which disclose apparata for the same general purposes are U.S. Pat. Nos. 6,391,074 B1; 6,143,047; 6,010,558; 5,601,715; 5,567,216; 5,540,744; 5,318,607; 5,196,040; and 4,635,617.

Some of the above identified publications are highly developed and complicated and appear to lead to higher costs in their production, purchase, installation and maintenance, to catch grease emanating from a vent, as well as increased electrical cost to operate them.

This invention is directed to subject matter that is simplified in cost of production, purchase, construction, installation, and maintenance, as well as eliminating electrical energy for its operation.

In view of the present-day noted escalations for using complicated apparata and the expenditure of electrical energy through their operations, this invention is called for in terms of the subject matter's simpler utility, costs, and maintenance operations.

SUMMARY OF THE INVENTION

In accordance with the present invention the assembly of a structured compartment related to a slotted flue is installed to a vent housing utilized for example, on a roof of a restaurant having an oven system which in use accumulates grease that must be removed.

The compartment includes a depth for deposit of a plurality of layers of fibrous material which absorb grease. In the assembly of the compartment to a flue, it is positioned immediately below the bottom wall of the flue. A portion of the length of the compartment extends beyond the bottom wall of the flue to provide ingress and egress of the fibrous materials. In the bottom wall of the flue, a slot is formed across its width. As flow of grease-ladened air travels along the passageway within a conventional vent housing, it arrives at the compartment connected to the passageway, the air being discharged from the flue, while accumulated grease drops through the slot into the layered fibrous material within the compartment.

Routine inspection of any layer of fibrous material onto which the grease has dropped indicates whether it should be removed and discarded in accordance with environmental procedures or may be reversed 180 degrees and replaced into the compartment for a second use of the layer by reason of dropped grease soiling only one half or less of the originally installed layer.

A stack of layers of fibrous layered material in the compartment may be introduced into the compartment only once after its last layer of fibrous material has been removed for its environmental disposal.

An object of this invention is to provide a novel assembly of a grease collecting compartment and a slotted flue.

An important object of the invention is to remove accumulation of grease deposits on a roof which in time would require re-roofing were such removal not available by reason of this invention.

Another object of the invention is to provide a simplified assembly of components.

A further object of the invention is to eliminate or reduce present day exorbitant costs in purchase, installation, and maintenance of presently available commercial devices.

A still further object of the invention is to reduce energy consumption and its attendant cost which accrues with today's commercial devices by means of this simplified mechanical assembly.

A yet another object of this invention is to eliminate repair of a roof or require a new roof because of damage to the roof by reason of accumulated grease.

These and other objects and advantages will become more apparent by a full and complete reading of the following description, its appended claims, and the accompanying drawing comprising two (2) sheets of two (2) FIGURES.

BEST MODE FOR CARRYING OUT THE INVENTION

Figure 1:
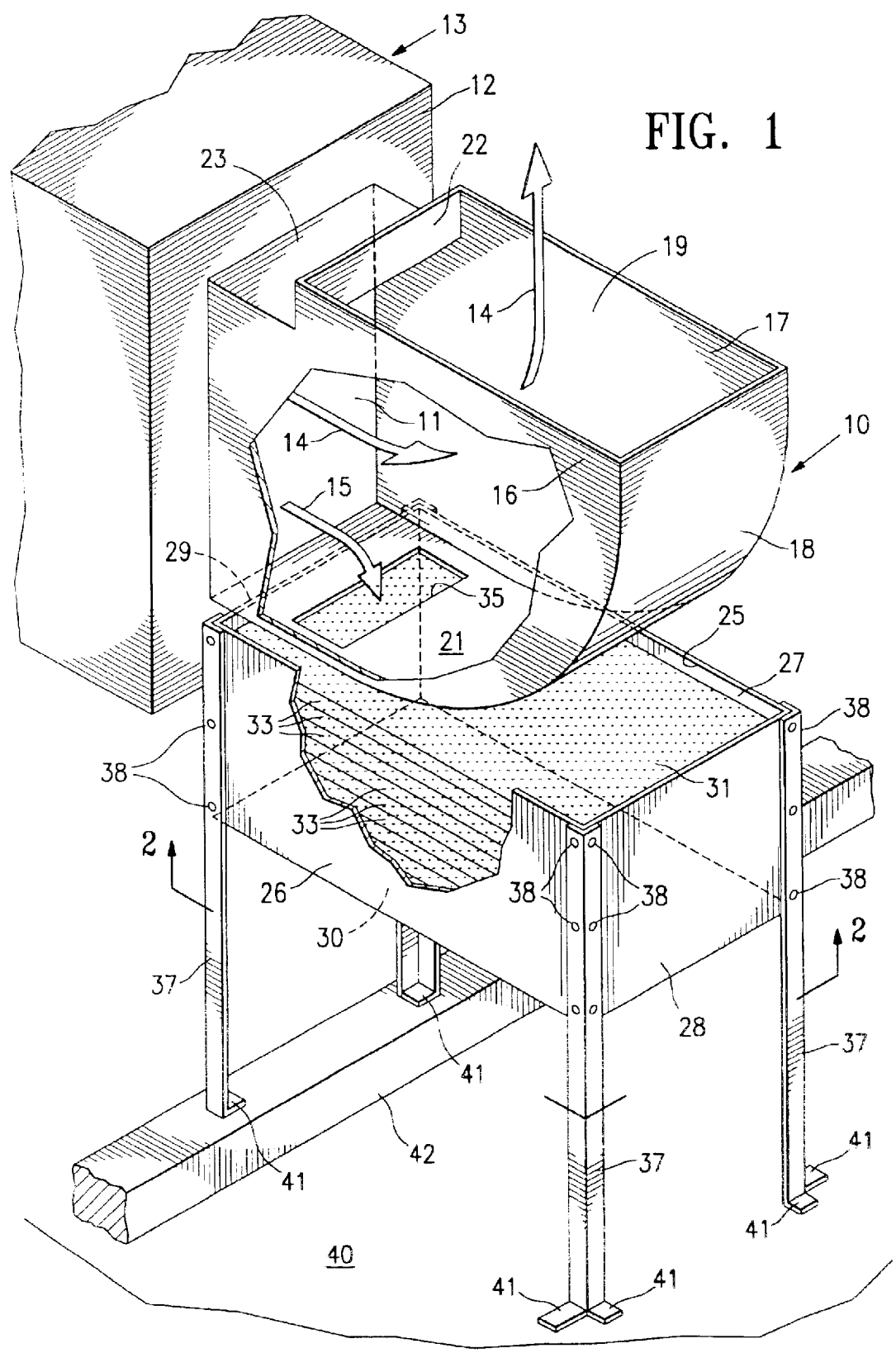
FIG. 1 is a perspective view, partly broken away, of the subject matter of the invention.

Turning to the drawing wherein reference characters refer to like numerals hereinafter, FIG. 1 illustrates an embodiment of subject matter in accordance with the present invention. A flue 10 is securely mounted about an opening 11 in a terminal wall 12 of a venting housing or duct 13 through which passage of air 14 (arrow) and grease 15 (arrow) flows into flue 10 through its opening mated with the housing's opening 11. Flue 10 includes a pair of side walls 16, 17, an air-directing wall 18, and at its top an exhaust opening 19 for the air 14. A bottom wall 21 of flue 10 joins with the air-directing wall 18 and side walls 16, 17 of flue 10, all of which are joined together by known procedures and techniques, including soldering. The exhaust opening 19 at the top of flue 10 extends from air-directing wall 18 to a vertically-oriented wall 22 offset from terminal wall 12 of housing, with a relatively short horizontally-oriented wall 23 joining vertically-oriented wall 22 to terminal wall 12 of housing 13.

Positioned below flue 10 a compartment 25 is formed by opposing pairs of walls 26, 27 and 28, 29, a bottom wall 30, and an open top 31. A multiple number of layers 33 of absorbing fibrous material is deposited or stacked within compartment 25 any one of which when on top of its stack cooperates with a slot 35 formed in bottom wall 21 of flue 10 in the operation of the invention.

In the illustrated embodiment, legs 37 function to support compartment 25 in a position immediately next to or below and in direct conjunction with bottom wall 21 of flue 10. Each leg 37 is suitably secured by rivets 38 or the like to both pairs of side wall 26, 27 and 28, 29 about their respective corners of such walls forming compartment 25. In this embodiment, the lengths of legs 37 extend downwardly to a roof or other base 40 to which integrally formed feet 41 on legs 37 seat on either roof 40 or an anchor bar 42 bolted to such base or roof 40 as part of construction for a venting system of which housing 13 is part.

The length of compartment 25 is longer than bottom wall 21 of flue 10, the purpose of which being to provide for manual ingress and egress of the layers 33 of absorbent fibrous materials. Such length serves another function in which a layer of material 33 at the top of its stack at any time in compartment 25 may be removed and reversed 180 degrees in its seating in compartment 25 so that the portion of such layer 33 that does not contain absorbed grease may be re-installed or located under slot 35 of flue 10, thereby doubling the usefulness of each layer 33 of material.

In operation, vented air and grease from a source, such as a kitchen oven system to which venting housing 13 is operatively connected, is caused to travel through housing 13 to opening 11 in terminal wall 12, by means of an independent force created by operation of a mechanical-electrical apparatus installed within housing 13 (which is not part of this invention). As the passage of air 14 and grease 15 reach flue 10, the direction of air 14 is directed out of flue 10 by air-directing wall 18 and the grease 15, being heavier than air, is accumulating along bottom wall 21 of flue 10, flowing into and through slot 35, to be absorbed by a layer 33 of fibrous material that is at the top of its stack irrespective of which one of the multiple number of layers of fibrous material is the top one in its stack, as some may have already been discarded. A visual inspection, by pulling such top layer 33 from its stack out of compartment 25 under flue 10, informs one whether such top layer should be discarded, in accordance with proper environmental procedures, or, even though it could be soiled in its portion concomitant to slot 35, be turned around 180 degrees for continued use as a top layer of fibrous material collecting grease 15. A soiled layer 33 may be discarded upon inspection that it is no longer useful in collecting further amounts of grease 15. With such discard, the next layer 33 of fibrous material atop of its stack is ready for immediate operational use in the same manner as was the discarded soiled layer 33.

Figure 2:
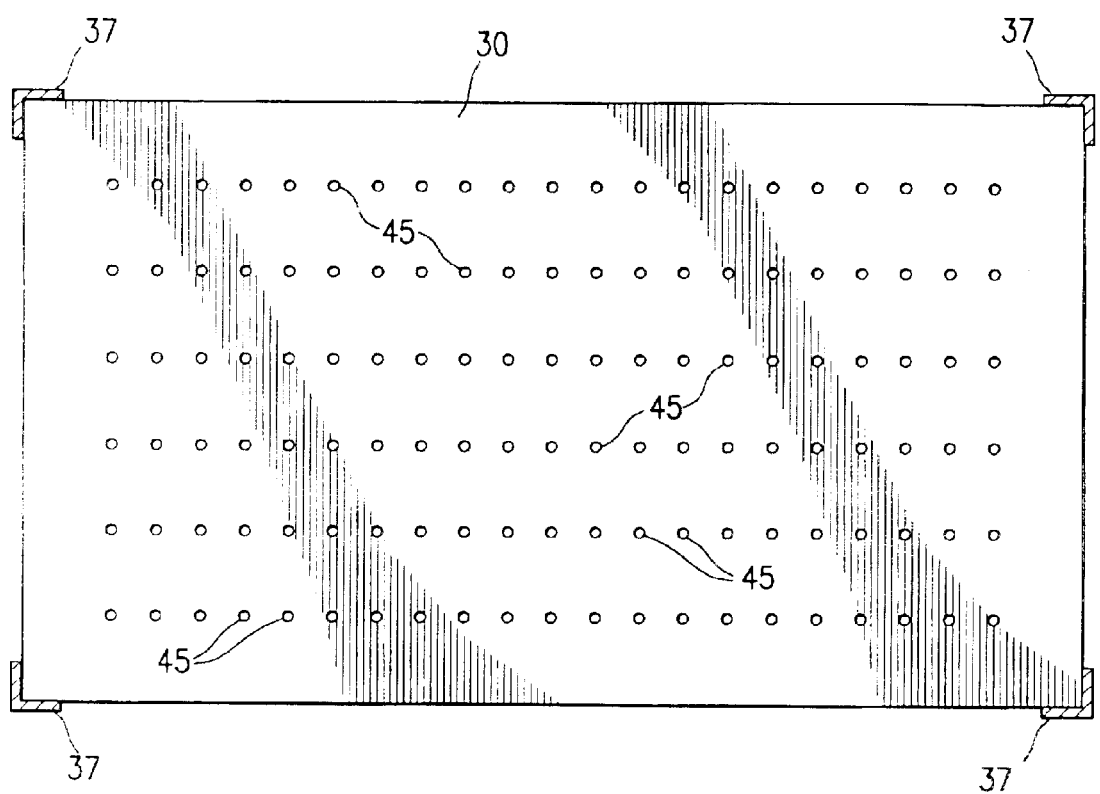
FIG. 2 is a view of the bottom wall forming the assembly's compartment, taken on line 2—2 of FIG. 1.

Turning to FIG. 2, a series of small apertures 45 are formed in bottom wall 30 of compartment 25 for draining water that otherwise could accumulate within compartment 25, to the detriment of usefulness of the fibrous material 33. It may be noted that the subject matter of this invention is utilized on roofs of restaurants most of which do not include a covering system for an assembly of this nature. Consequently, the elements of nature would otherwise accumulate within compartment 25 and thereby decrease if not extinguish the functional use of the fibrous material of layers 33.

The walls of compartment 25 and flue 10 preferably are conventionally fabricated out of 26-gauge bonded steel, with soldered seams for joining the walls and with a hem at its top for safety of person. Legs 37 also are preferably formed from steel. The assembly of flue 10 and the structured compartment 25 are undertaken with known present day techniques and procedures.

Various modifications, changes and adaptations of the assembly of the subject matter of this invention may be utilized without affecting or falling out of the spirit and scope of the invention. For example, the series of apertures 45 in bottom wall 30 may not be required to remove the accumulation of water were a roofing or cover installed over the subject matter itself, to prevent water from ingressing into compartment 25.

Industrial Applicability

The invention is applicable to venting systems mounted on rooftops or the like and through which systems grease is to be collected for proper environmental disposal.

Nomenclature List 10 flue
11 opening in 13
12 terminal wall of housing 13
13 housing/duct
14 air (arrow)
15 grease (arrow)
16 side wall
17 side wall
18 air directing wall
19 exhaust opening
20
21
22 vertically-oriented wall
23 horizontally-oriented wall
24
25 compartment
26 wall of $1^{st}$ pair
27 wall of $1^{st}$ pair
28 wall of $2^{nd}$ pair
29 wall of $2^{nd}$ pair
30 bottom wall for 25, FIG. 2
31 open top
32
33 layers of fibrous materials
34
35 slot in flue 10
36
37 flanges/standards
38 rivets
39
40 roof/base
41 feet on 37
42
43
44
45 apertures, FIG. 2

I claim:

1. The assembly of a flue having a bottom wall with a slot in it, an air-directing wall joined to said bottom wall, and an exhaust opening at the top of said flue, and a compartment positioned immediately below said bottom wall of said flue, said compartment having an open top in immediate relation to and below said slot, said compartment adapted for deposit of fibrous material below said slot for absorbing grease collecting in the flue as vented air and grease in a housing to which the flue is adapted to be connected discharges into the flue, the vented air being directed through said exhaust opening.

2. The assembly of claim 1 wherein
said compartment includes a wall at its bottom having a series of spaced apertures therein for draining water from the compartment.

3. The assembly of claim 2 including
fibrous material deposited in the compartment.

4. The assembly of claim 1 including
fibrous material deposited in the compartment.

5. The assembly of claim 4 wherein
said fibrous material comprises
a plurality of layers of fibrous material.

6. The assembly of claim 3 wherein
said fibrous material comprises
a plurality of layers of fibrous material.

7. The assembly of claim 2 wherein
said fibrous material comprises
a plurality of layers of fibrous material.

8. The assembly of claim 1 wherein
said fibrous material comprises a plurality of layers of fibrous material.

9. The assembly of claim 1 wherein
said compartment includes a dimension in the sane direction as the length of said flue from the housing to which it is adapted to be connected and which dimension is longer than the bottom wall of the flue for ingress to and egress of fibrous material.

10. The assembly of claim 9 wherein
said compartment includes a wall at its bottom having a series of spaced apertures therein for draining water from the compartment.

11. The assembly of claim 10 including
fibrous material deposited in the compartment.

12. The assembly of claim 9 including
fibrous material deposited in the compartment.

13. The assembly of claim 12 wherein
said fibrous material comprises
a plurality of layers of fibrous material.

14. The assembly of claim 11 wherein
said fibrous material comprises
a plurality of layers of fibrous material.

15. The assembly of claim 10 wherein
said fibrous material comprises
a plurality of layers of fibrous material.

16. The assembly of claim 9 wherein
said fibrous material comprises
a plurality of layers of fibrous material.

17. The assembly of claim 1 including
a housing having a passageway through which the vented air and grease are passing, said flue securely mounted to said housing.

18. The assembly of claim 17 wherein
said compartment includes a wall at its bottom having a series of spaced apertures for draining water through the bottom wall in the bottom of the compartment.

19. The assembly of 18 including
fibrous material deposited in the compartment.

20. The assembly of 17 including
fibrous material deposited in the compartment.

21. The assembly of claim 20 wherein
said fibrous material comprises
a plurality of layers of fibrous material.

22. The assembly of claim 19 wherein
said fibrous material comprises
a plurality of layers of fibrous material.

23. The assembly of claim 18 wherein
said fibrous material comprises
a plurality of layers of fibrous material.

24. The assembly of claim 17 wherein
said fibrous material comprises
a plurality of layers of fibrous material.

* * * * *